(12) United States Patent
Payne et al.

(10) Patent No.: US 7,571,857 B2
(45) Date of Patent: Aug. 11, 2009

(54) APPARATUS AND METHODS FOR ACQUIRING GPS DATA FOR USE WITH PORTABLE DATA TERMINALS

(75) Inventors: Gregory Jon Payne, Charlotte, NC (US); Sven M. A. Powilleit, Charlotte, NC (US); Jim T. Sauerwein, Charlotte, NC (US)

(73) Assignee: Hand Held Products, Inc., Skaneateles Falls, NY (US)

( * ) Notice: Subject to any disclaimer, the term of this patent is extended or adjusted under 35 U.S.C. 154(b) by 315 days.

(21) Appl. No.: 11/622,615

(22) Filed: Jan. 12, 2007

(65) Prior Publication Data

US 2008/0169977 A1 Jul. 17, 2008

(51) Int. Cl.
*G06K 15/00* (2006.01)
*G06K 7/10* (2006.01)

(52) U.S. Cl. .................. 235/462.13; 235/472.01; 235/472.02

(58) Field of Classification Search ............ 342/357.07, 342/357.09; 235/462.45, 462.46, 472.01, 235/472.02, 462.13
See application file for complete search history.

(56) References Cited

U.S. PATENT DOCUMENTS

| | | | |
|---|---|---|---|
| 6,505,121 B1 * | 1/2003 | Russell | 701/213 |
| 6,909,907 B1 * | 6/2005 | Oyang et al. | 342/357.1 |
| 7,151,950 B1 * | 12/2006 | Oyang et al. | 455/556.1 |
| 2004/0019732 A1 * | 1/2004 | Overtoom et al. | 710/313 |
| 2004/0192352 A1 * | 9/2004 | Vallstrom et al. | 342/357.09 |
| 2005/0113124 A1 * | 5/2005 | Syrjarinne et al. | 455/522 |
| 2006/0119313 A1 * | 6/2006 | Chang | 320/101 |

OTHER PUBLICATIONS

LinuxDevices.com, IBM unveils Linux-based PDA reference design, http://www.linuxdevices.com/news/NS9222005703.html, Jan. 2003.*
MobileTechReview, Sharp Zaurus SL-C3200, http://www.mobiletechreview.com/Sharp-Zaurus-C3200.htm, Aug. 2006.*

* cited by examiner

*Primary Examiner*—Thomas H Tarcza
*Assistant Examiner*—Fred H Mull
(74) *Attorney, Agent, or Firm*—Hiscock & Barclay, LLP

(57) ABSTRACT

A data collection system including a portable data terminal and a base for receiving the portable data terminal. The portable data terminal having a first interface for receiving power and a second interface for connecting to a communication link. The base having a housing adapted to receive and support the portable data terminal, a power supply receiving power from an external power source and upon insertion of the portable data terminal into the housing supplying power to the first interface on the portable data terminal, a communication link adapted to interface with the portable data terminal, and a location determination device, such as a GPS receiver, connected to the communication link and supplying the portable data terminal with location data via the communication link.

20 Claims, 6 Drawing Sheets

APPARATUS AND METHODS FOR ACQUIRING GPS DATA FOR USE WITH PORTABLE DATA TERMINALS

BACKGROUND OF THE INVENTION

The term Portable data terminal (PDT) refers to data collection devices used to collect, process, and transfer data to a larger data processing system. Most PDTs are ruggedized to some extent for use in industrial environments. The tougher the environment, the more robust the PDT. PDT's are available from several sources, including the assignee of the present application: HAND HELD PRODUCTS, INC.

A PDT generally comprises a mobile computer, a keypad, and a data acquisition device. The mobile computer generally comprises a hand held (or "pocket") computing device, such as those available from INTEL, PALM, HEWLETT PACKARD, and DELL. Keypads come in a variety of alpha-numeric and numeric configurations. The data acquisition device generally comprises a device that captures data from, for example, radio frequency IDs (RFID), images, and bar codes. Data may also be captured via keypad entry and utilization of a touch pad associated with the mobile computer.

FIG. 1A is an orthogonal view of a known PDT 100. FIG. 1B is a plan view of the known PDT 100. The illustrated example utilizes a popular form factor incorporating a body 102 and a handle 101. The body 102 generally supports a variety of components, including: a battery (not shown but typically located on the rear half of the body): an LCD with touch screen 106; a keyboard 108 (including a scan button 108a): a scan engine 110: and a data/charging port 112 (not fully illustrated). The scan engine 110 may comprise, for example, an image engine or a laser engine. The data/charging port 112 typically comprises a proprietary interface with one set of pins or pads for the transmitting and receiving of data and a second set of pins or pads for receiving power for powering the system and/or charging the battery.

The handle 101, extending from a bottom surface of the body 102, incorporates a trigger 114. In use, the user may actuate either tile scan key 108a or the trigger 114 to initiate a frame capture via the image engine 110. The captured frame may either be processed as an image or as a data carrier. In the first case, the captured frame may undergo some post capture image processing, such as de-speckling or sharpening and then stored as an image file (e.g. a bitmap, jpeg of gif file) and possibly displayed. In the second case the captured frame also undergoes some post capture image processing but the image is then analyzed, e.g. decoded, to identify data represented therein. The decoded data is stored and possibly displayed on the PDT 100. Additional processing of the image or data may take place on the PDT 100 and/or a data processing resource to which the data is transmitted via any available transport mechanism on the PDT 100. Some examples of known transport mechanisms utilized by PDT's include: Bluetooth, WiFi, GSM, GPRS, CDMA, USB, IEEE 1394, IrDA, removable FLASH memory, parallel and serial ports (including for example, RS-232).

A recent development in the PDT marketplace is the integration of location determination hardware and software, such as the Global Positioning System (GPS) and Galileo system. Using GPS as an example, the system generally comprises a GPS receiver that receives a signal from one or more GPS satellites and calculates a location of the receiver from the received signal(s). To calculate a location, the GPS receiver demodulates the signal(s) from the GPS satellite and acquires orbit data for the GPS satellite. Then, from an orbit of the GPS satellite, current time information, and a delay time of a received signal, the GPS receiver derives a three-dimensional location by solving a series of simultaneous equations.

One application for which the combination of a GPS receiver and a PDT is useful is package delivery. The combination of a PDT and GPS receiver allows a delivery driver to stamp delivery data with location data. One potential problem is that GPS systems are line of sight systems that require a direct line of sight to the sky. Such a line of sight may be difficult to obtain with a portable device that is often used in the back of a delivery truck or within entryways and buildings to which the driver is delivering packages. Another potential problem is managing the power drain and incorporating yet another receiver and antenna in the already crowded housing of a PDT.

Accordingly, the present Inventors have recognized a need for apparatus and methods to provide GPS data to a PDT without limiting the functionality of either the GPS unit or the PDT.

BRIEF DESCRIPTION OF THE DRAWINGS

An understanding of the present invention can be gained from the following detailed description of embodiments of the invention, taken in conjunction with the accompanying drawings of which.

DETAILED DESCRIPTION

Figure 1A:
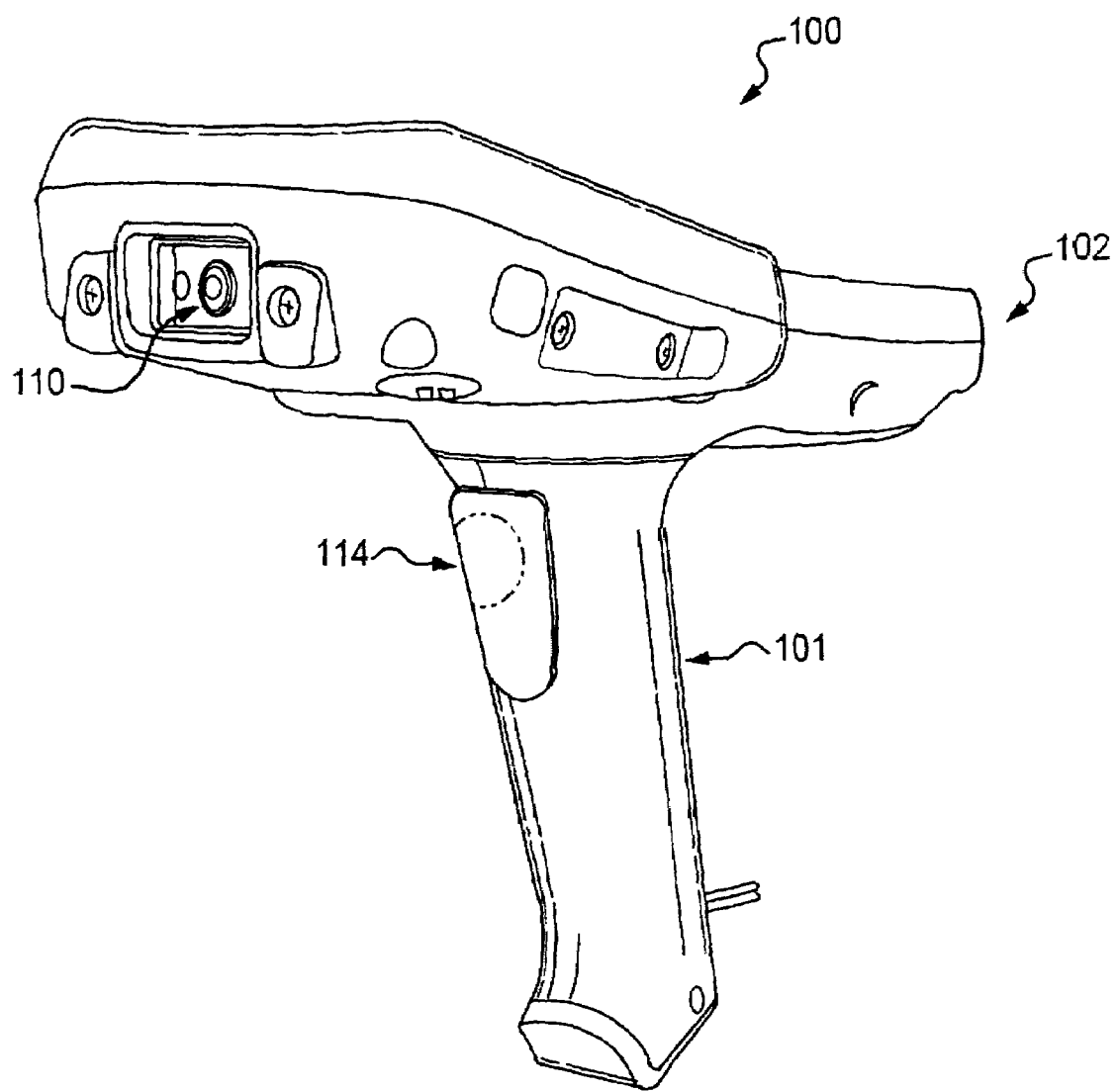
FIG. 1A is an orthogonal view of a known PDT.
Figure 1B:
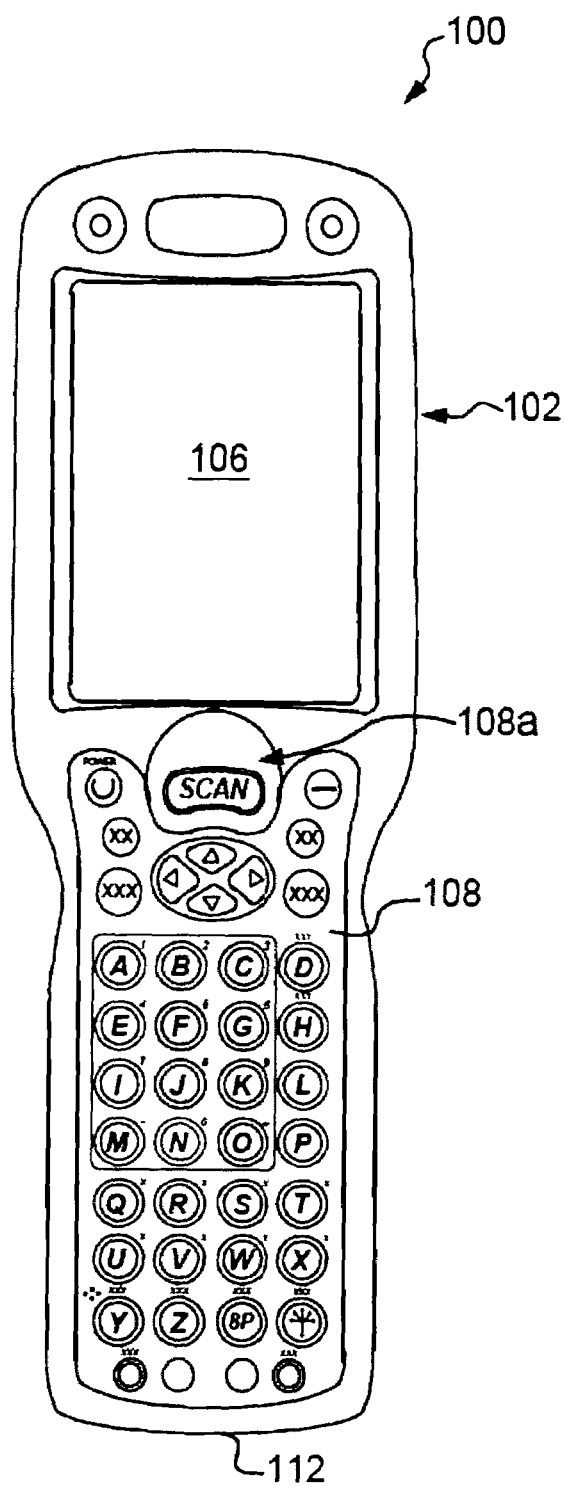
FIG. 1B is a plan view of a known PDT.

Reference will now be made in detail to the present invention, examples of which are illustrated in the accompanying drawings, wherein like reference numerals refer to like elements throughout. The following description will use nomenclature associated with an imager based PDT, however those of ordinary skill in the art will recognize that the present invention is applicable to a variety of portable devices including RF or magstripe based PDTs, personal data assistants (PDAs); bar code scanners, and consumer electronics, for example digital cameras, cellular phones, and the like. It is anticipated that many such portable devices would benefit from the present invention, including the embodiments thereof described herein.

A method is here, and generally, conceived to be a sequence of steps or actions leading to a desired result and may be implemented as software. While it may prove convenient to discuss such software as if were embodied by a single program, most implementations will distribute the described functions among discrete (and some not so discrete) pieces of software. These pieces are often described using such terms of art as "programs," "objects," "functions," "subroutines," "libraries," ".dlls," "APIs," "processes," and "procedures." While one or more of these terms man find favor in the present description, there is no intention to limit the invention or the described embodiments to the recited configurations.

With respect to the software described herein, those of ordinary skill in the art will recognize that there exist a variety of platforms and languages for creating software for performing the methods outlined herein. Embodiments of the present invention can be implemented using MICROSOFT VISUAL STUDIO or any number of varieties of C. However, those of ordinary skill in the art also recognize that the choice of the exact platform and language is often dictated by the specifics of the actual system constructed. such that what may work for one type of system may not be efficient on another system. It should also be understood that the methods described herein are not limited to being executed as software on a processor or DSP (Digital Signal Processor), but can also be implemented in a hardware processor. For example, the methods could be implemented with HDL (Hardware Design Language) in an ASIC.

In the present description, an element number followed by a letter generally indicates multiple occurrences of similar, either in structure or function, elements. Further, the use of an italicized "n" (e.g. n) associated with an element number generally denotes either an unspecified one of such elements or a partial or complete group of such elements—the meaning of which is to be drawn from the context of such use.

Figure 2:
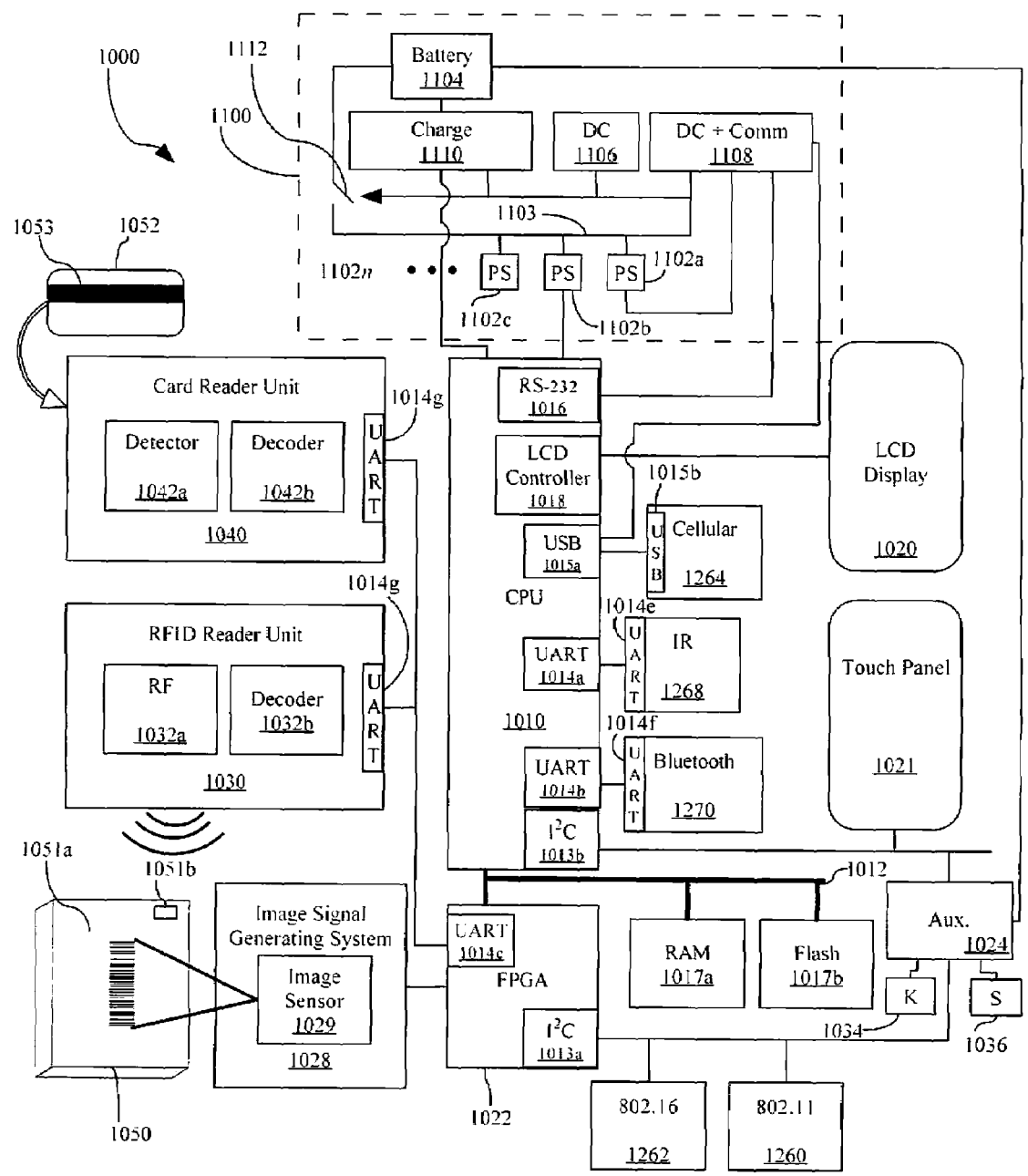
FIG. 2 is a block diagram of a PDT in accordance with an embodiment of the present invention.

FIG. 2 is a block diagram of a PDT 1000 in accordance with an embodiment of the present invention. Those of ordinary skill in the art will recognize that the illustrated design of the PDT 1000 has been simplified so as to permit a briefer explanation of systems and components not directly related to the present invention.

A central processing unit (CPU) 1010 receives data from and outputs data to other sub-systems for storage, transmission and additional processing. CPU 1010 may be implemented using any number of off the shelf solutions including: embedded processors, such as an XSCALE processor available from INTEL; general purpose processors, such as a PENTIUM 4 available from INTEL; or any number of custom solutions including pre-configured field programmable gate arrays (FPGAs) and application specific integrated circuits (ASICs). Overall operation of the CPU 1010 is controlled by software or firmware, typically referred to as an operating system, stored in one or more memory locations 1017*n*, including RAM 1017*a* and FLASH memory 1017*b*. Examples of suitable operating systems for PDT 1000 include: WINDOWS MOBILE, WINDOWS CE, WINDOWS XP, LINUX, PALM, SYMBIAN, and OSX.

In general, communication to and from the CPU 1010 and the various sub-components takes place via one or more ports or busses, including a main system bus 1012: I²C busses 1013*a* and 1013*b*; a plurality of Universal Asynchronous Receivers/Transmitter (UART) ports 1014*n*, a Universal Serial Bus (USB) 1015*n* and an RS-232 port 1016.

The illustrated CPU 1010 also includes a liquid crystal display (LCD) controller 1018 for controlling an LCD 1020. A touch sensitive panel 1021, which may be in communication with one or more of the CPU 1010 and an auxiliary processor 1024 via the I²C bus 1013*b*, may be associated with the LCD 1020 for receipt of data thereon. The combination of the LCD 1020 and the touch sensitive panel 1021 is often referred to as a "touch screen."

A variety of secondary (or "sub") processors may be provided to perform general and application specific functions. The example illustrated in FIG. 2 provides two such processors: a field programmable gate array (FPGA) 1022 and the auxiliary processor 1024. The FPGA 1022 may comprise any number of FPGA including the Virtex-4 family available from XILINX. The auxiliary processor 1024 may comprise any number of embedded (or general purpose) processors, including the PICmicro® family of microcontrollers available from MICROCHIP TECHNOLOGY.

The auxiliary processor 1024 may interface with and control a variety of data input devices including, for example, the touch panel 1021, a keyboard 1034 and a scan button 1036. By way of example, the PDT 1000 may be configured so that displayed menu options are selected by physically depressing a key on the keyboard 1034 or activating the touch screen 1021 with use of a finger or stylus. The scan button 1036 may be used for initiating and controlling the various data collection systems, such as an image signal generating system 1028, an RFID sensing system 1030, or a magnetic stripe reader 1040.

The data collection systems (e.g. the image signal generating system 1028, the RFID sensing system 1030, and the magnetic stripe reader 1050) may be controlled by one or more of the CPU 1010, the auxiliary processor 1024, and the FPGA 1022. In this case, the FPGA 1022 initiates and controls the operation of the data collection systems and accumulates data received there from prior to depositing such data in memory 1017*n*. Possible configurations of FPGA 1022 are illustrated in U.S. Pat. No. 6,947,612 incorporated herein by reference.

The image signal generating system 1028 generally comprises a two dimensional solid state image sensor 1029 utilizing such technologies as CCD, CMOS, and CID, for capturing an image containing data, e.g. a bar code or signature. Two-dimensional solid state image sensors generally have a plurality of photo sensor picture elements ("pixels") which are formed in a pattern including a plurality of rows and a plurality of columns of pixels. The image signal generating system 1028 further includes an imaging optics (not shown) focusing an image onto an active surface of the image sensor 1029. Image sensor 1029 may be incorporated on an image sensor IC chip having disposed thereon image sensor control circuitry, image signal conditioning circuitry, and an analog-to-digital converter. FPGA 1022 manages the capture and transfer of image data into RAM 1017*n*. Decoding may be performed by the CPU 1010 or any suitable secondary processor. Examples of devices suitable for use as the imaging assembly 1028 include an IMAGETEAM 5×00 VGA/5×00 MPX imaging module of the type available from Hand Held Products, assignee of the present application. A variety of alternatives, including dedicated laser barcode scanners may also be utilized.

One use of the image signal generating system 1028 is for reading and interpreting bar codes such as bar code 1051*a* on an item 1050. For this operation, when the scan button 1036 is actuated, the CPU 1010 causes the appropriate control signals to be sent to the image sensor 1029. In response thereto, the image sensor 1029 outputs digital image data including (hopefully) an adequate representation of the bar code symbol 1050. The digital image data is streamed to the FPGA 1022 where it is collected and subsequently deposited in memory 1017*n*. In accordance with a decoding program (not specifically illustrated) an attempt may be made to decode the bar code represented in the captured electronic image representation. The capture and decoding of image data may occur automatically in response to a trigger signal being generated, usually by activation of the scan button 1036 or a pre-selected key on keyboard 1034. For example, the CPU 1010 may be configured, typically through execution of a program resident in memory 1017*n*, to continuously capture and decode bar code symbols represented therein as long as scan button 1036 is actuated. The cycle may be terminated upon successfully decoding the bar code symbol or by timing out after a number of unsuccessful attempts.

In addition to having a decode operation, the image signal generation system 1028 may also be configured for an image capture operation. In an image capture operation, control circuit 1010 captures an electronic image representation in response to the scan button 1036 being actuated without attempting to decode a decodable symbol represented therein. The captured electronic image representation may be one or more of (i) stored into a designated memory location of memory 1017*n*. (ii) transmitted to an external spaced apart device, or (iii) displayed on LCD 1020. This mode may be used to capture, for example an image of a signature or damage to a package.

The RFID reader unit 1030 includes an RF oscillation and receiver circuit 1032*a* and a data decode processing circuit 1032*b*. RFID reader unit 1030 may be configured to read RF encoded data from an RFID tag, such as tag 1051*b*, which may be disposed on article 1050.

Where the RFID reader unit 1032*a* is configured to read RF encoded data from a passive RFID tag, the RF oscillation and receiver circuit 1032*a* transmits a carrier signal to the passive tag which in turn converts the carrier energy to voltage form and actuates a transponder (not shown) to transmit a radio signal representing the encoded tag data. The RF oscillator and receiver circuit 1032*a*, in turn, receives the radio signal from the tag and converts the data into a digital format. The data decode processing circuit 1032*b*, typically including a low cost microcontroller IC chip, decodes the received radio signal information received by RF oscillator and receiver circuit 1032*a* to decode the encoded identification data originally encoded into RFID tag.

RFID reader unit 1030 may, for example, operate in a selective activation mode or in a continuous read operating mode. In a selective activation mode, RFID reader unit 1030 broadcasts radio signals in an attempt to activate a tag or tags in its vicinity in response to an RFID trigger signal being received. In a continuous read mode, RFID reader module 1030 continuously broadcasts radio signals in an attempt to actuate a tag or tags in proximity with the unit automatically, without module 1030 receiving a trigger signal. PDT 1000 may be configured so that the CPU 1010 recognizes a trigger signal under numerous conditions, such as: (1) the trigger 1034 is actuated; (2) an RFID trigger instruction is received from a remote device; or (3) the CPU 1010 determines that a predetermined condition has been satisfied.

Still further, the PDT 1000 may include a card reader unit 1040 for reading data from a card 1052. Card reader unit 1040 generally comprises a signal detection circuit 1042*a* and a data decode circuit 1042*b*. In operation, the signal detection circuit 1042*a* detects data from, for example, a magnetic strip 1053 on a card 1052. Subsequently, the data decode circuit 1042*b* decodes the data. The decoded data may be transmitted to the CPU 1010 for further processing via the FPGA 1022. The card reader unit 1040 can be selected to be of a type that reads card information encoded in more than one data format. For example, the card reader unit 1040 may comprise a Panasonic ZU-9A36CF4 Integrated Smart Reader capable of reading any one of magnetic stripe data, smart card or Integrated circuit card (IC card) data, and RF transmitted data.

A power circuit 1100 supplies power to the PDT 1000. The power circuit 1100 generally comprises a series of power supplies 1102*n* that regulate the power supplied to the various components of the PDT 1000. The power supplies 1102*n* each generally comprise step up or step down circuits which are in turn connected to each of the various components in the PDT 1000 that require the particular voltage output by that power supply 1102*n*.

The power supplies 1102*n* receive current from a power bus 1103 which is, in turn, supplied by one of a battery 1104, a first power input 1106 or a connector 1108 that includes a second power input. The first power input 1106 may comprise a DC power jack, for example, a 2.5 mm coaxial DC power plug which receives DC voltage from a conventional AC/DC transformer. The connector 1108 may comprise any number of known connection technologies, such as the D Series of circular plastic connectors or the HCL D-sub derivative design data transfer connector available from HYPERTRONICS. INC. Certain pins of the connector 1108 may be dedicated to receiving DC power, for example 9.5 volts, while other pins are dedicated to one or more communication paths. e.g. RS-232 and USB. It may also prove advantageous to provide DC power out, for example from a power supply 1102*a*, so as to power tethered accessories, such as external magnetic stripe or RFID readers (not shown). It may prove further advantageous to add circuitry to insulate the first power input 1106 from the second power input on the connector 1108 and other components in the PDT 1000 in the event that a user attempts to supply power to both power inputs.

The battery 1104 may be selected from any of a variety of battery technologies including fuel cell, NiMh, NiCd, Li Ion, or Li Polymer. The battery 1104 is charged by a charge circuit 1110 which receives power from either the first power input 1106 or the second power input on the connector 1108. The charge circuit may comprise any of a number of available circuits. In the example shown in FIG. 2, control is provided to the CPU 1016 which may modify the charging behavior of the charge circuit 1110 based on information generated by the auxiliary processor 1024. In this example, the auxiliary processor 1024 monitors battery chemistry, such as gas content, via known interfaces, such as the SMART battery interface as specified by the Smart Battery System Implementers Forum. A switch 1112 isolates the battery based upon the presence of power from the first power input 1106 or the second power input on the connector 1108. Thus, when an external power supply is connected to the power input 1106 or the second power input on the connector 1108, the battery is isolated from the power supplies 1102*n* and may be charged via the charge circuit 1110. Once power is removed from the power input 1106 and the connector 1108, the battery is connected to the power supplies 1102*n*.

The PDT 1000 may further include a plurality of wireless communication links such as an 802.11 communication link 1260, an 802.16 communication link 1262, a communication link 1264 for communication with a cellular network such as a network in accordance with the Global System for Mobile Communications (GSM), an IR communication link 1268, and a Bluetooth communication link 1270. Each of these links facilitates communication with a remote device and may be used to transfer and receive data.

Figure 3:
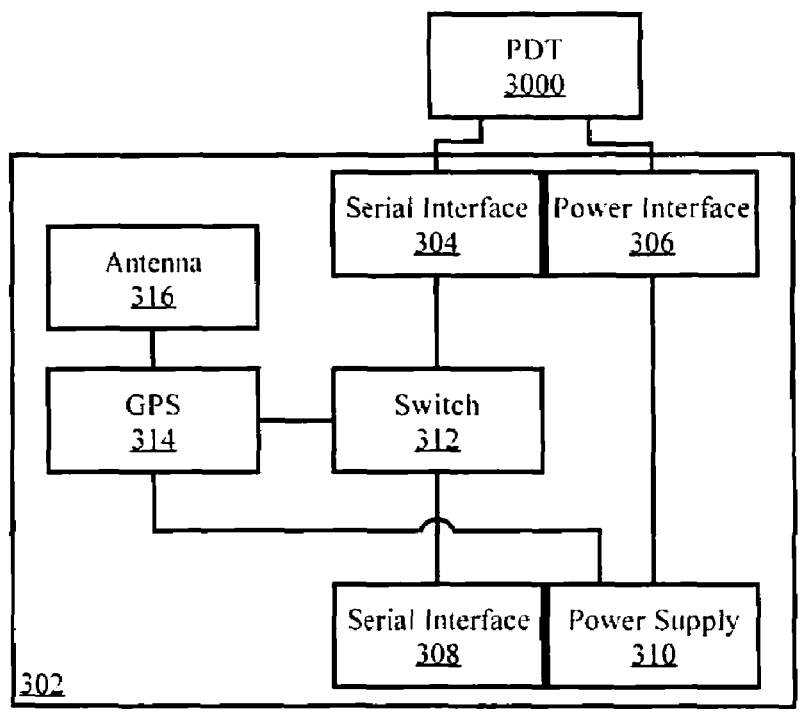
FIG. 3 is a block diagram of a mobile base in accordance with an embodiment of the present invention.

FIG. 3 is a block diagram of a mobile base 302 in accordance with an embodiment of the present invention. In general, the mobile base 302 illustrated in FIG. 3 comprises a first Serial interface 304 and a first power interface 306 respectively coupled with a second serial interface 308 and a second power interface 310.

The traditional function of a mobile base is to act as a docking station facilitating connection of a pourer supply and a communication path to the mobile base. A PDT 3000 inserted into a traditional mobile base obtains access to an external power supply and any communication channels connected to the mobile base.

As such, referring to FIG. 3, the first serial interface 304 and first power interface 306 are configured to interface with a corresponding interface on the PDT 3000, such as the connector 1108 illustrated in FIG. 2. As may be expected, the second serial interface 308 and the power supply 310 respectively interface with an external communication path and a voltage source. The power supply 310 may include a variety of known circuits, such as filters and the like, that regulate the supply of power to the power interface 306. The communication path may comprise a serial cable that may, for example, be connected to a printer or vehicle network. The voltage source typically comprises a vehicle battery connected via a power cord plugged into a standard cigarette lighter.

In the embodiment illustrated in FIG. 3, a GPS receiver 314 is integrated within the housing of the mobile base 302 and receives power from the power supply 310. The GPS receiver 314 is connected to an antenna 316 that may either comprise an integrated patch antenna or an antenna mounted external of the mobile base 302, for example on a roof of a vehicle. In general, any location determining device is suitable for use with the present invention, however the industry does seem to be standardizing on GPS receiver that output standard NMEA (National Marine Electronics Association) sentences. The GPS receiver 314 may, for example comprise an uPATCH 100 from FASTRAX Ltd.

A switch 312 alternatively connects the serial interface 304 to the second serial interface 308 or the GPS receiver 314. In use, the PDT 3000 would either communicate with the second serial interface 308 or the GPS receiver 314. The switch 312 may be configured to be responsive to a signal transmitted by the attached PDT over the serial interface 304. For example, a dedicated pin may be provided within the first serial interface 304 (and the PDT 3000) that provides a control signal (generally high or low) to the switch 312.

In one example, the PDT 3000 is generally connected to the serial interface 308 and periodically outputs a first signal to cause the switch to direct the output of the GPS unit 314 to the PDT 3000. Once a complete NEMA string is captured, the PDT 3000 may output a second signal to cause the switch to reconnect the serial interface 308. The time period between outputting first signals may be fixed or dependent upon the output of the GPS unit 314, e.g. as the vehicle approaches a destination, the time period decreases to obtain finer granularity.

The PDT 3000 may utilize the output of the GPS unit 314 to assist with a variety of uses. Co-pending U.S. patent application Ser. No. 11/370,189 (filed on Mar. 6, 2006, assigned to the assignee of the present application and incorporated herein by reference) discloses a variety of uses for GPS data.

Figure 4:
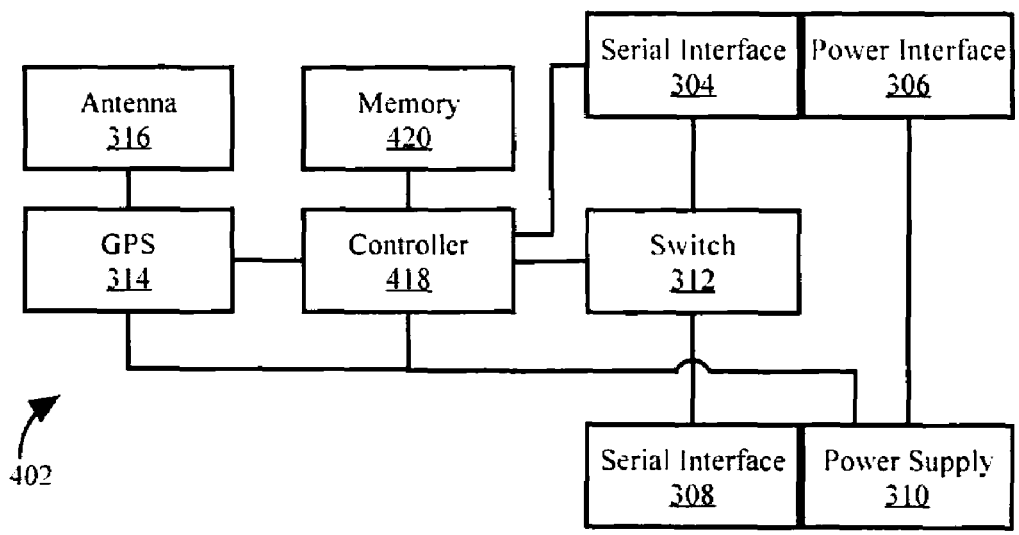
FIG. 4 is a block diagram of a mobile base in accordance with an embodiment of the present invention.

FIG. 4 is a block diagram of a mobile base 402 in accordance with an embodiment of the present invention. The embodiment illustrated in FIG. 4 differs from the embodiment described with respect to FIG. 3 in that a controller 418 and asociated memory 420 are provided. In the example illustrated in FIG. 4, the controller 418 is connected between the GPS unit 314 and the switch 312, however other configurations are possible. As the mobile base 302 is generally fixed in place and not required to be portable, size is generally not an issue. As such the memory 420 may comprise a hard drive or some other large capacity device such as a CD-ROM drive.

The controller 418 may be programmed to perform a variety of tasks, including interfacing the GPS 314 with a PDT (not shown, but see generally FIG. 2 and FIG. 3). The controller may also perform location based tasks. For example, the controller 418 may be configured to monitor the output of the GPS unit 314 and based upon a proximity to a pre-defined location perform an action, such as adding an entry to a database stored in the memory 420 or send a signal to the PDT (not shown). In another example, the memory 420 may be provided with a complete set of map data from which selected maps may be served to the PDT as requested—perhaps based upon data from the GPS unit 314. This alleviates the need to store the complete set on the PDT or for the PDT to access a remote server (usually over a slow wireless connection) for individual maps.

In the configuration shown in FIG. 4, the controller 418 is connected to the serial interface 304 (and thence to the PDT) through the switch 312. Control of the switch 312 maybe handled either by the controller 418 or the PDT. In the case of PDT control the controller 418 may be provided with a dedicated line(s) to the serial interface 304 so as to signal the PDT to request communication therewith, for example when approaching a waypoint. The PDT would in turn instruct the switch 312 to switch to the controller 418.

Figure 5:
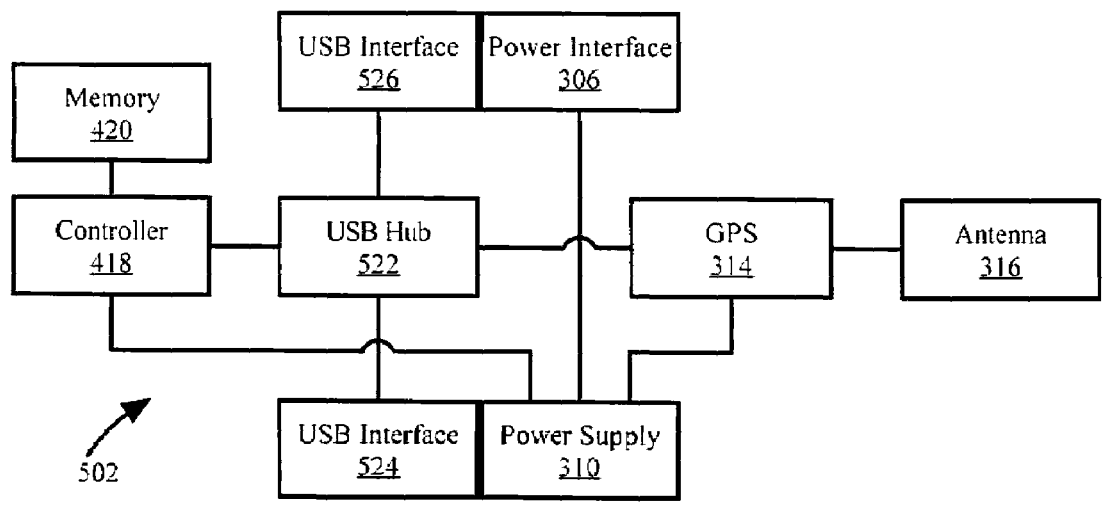
FIG. 5 is a block diagram of a mobile base in accordance with an embodiment of the present invention.

FIG. 5 is a block diagram of a mobile base 502 in accordance with an embodiment of the present invention. The embodiment illustrated in FIG. 5 differs from the embodiment described with respect to FIG. 4 in that a USB hub 522, USB interface 526 and USB interface 524 are provided instead of the switch 312, serial interface 304, and serial interface 308 respectively. As is known to those of ordinary skill in the art a USB hub is a device that allows many USB devices to be connected to a single USB port on another device or hub. In general, the USB specification requires that one device act as a master with the remaining devices acting as slaves. As most PDTs and GPS devices are used in slave mode, the controller 418 maybe configured as the master device. It may prove also preferable to utilize the masterless USB-on-the-go standard to facilitate communication.

Figure 6:
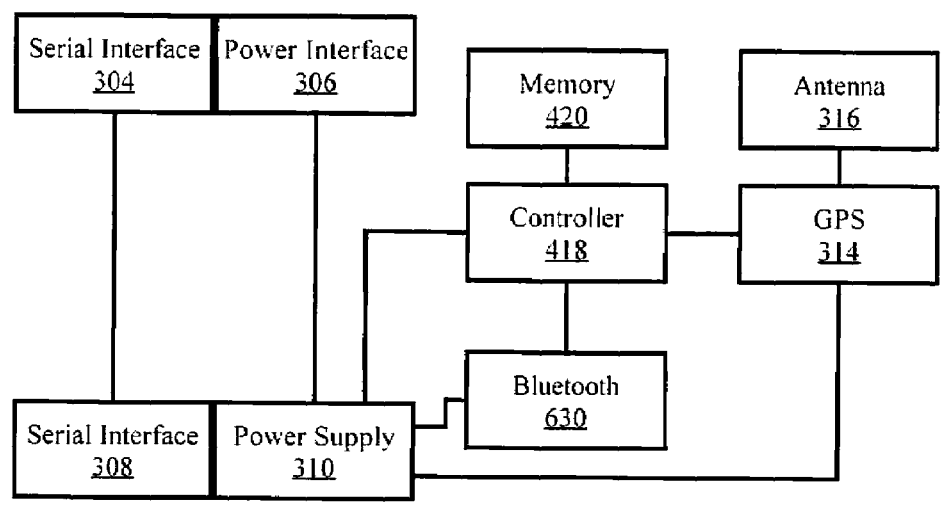
FIG. 6 is a block diagram of a mobile base in accordance with an embodiment of the present invention.

FIG. 6 is a block diagram of a mobile base 602 in accordance with an embodiment of the present invention. The embodiment illustrated in FIG. 5 differs from the embodiment described with respect to FIG. 4 in that a Bluetooth transmitter and receiver 630 is provided to form a personal area network with a PDT (not shown) for transfer of the GPS data. This configuration facilitates the transfer of GPS data to a PDT spaced apart from the mobile base 602.

Figure 7:
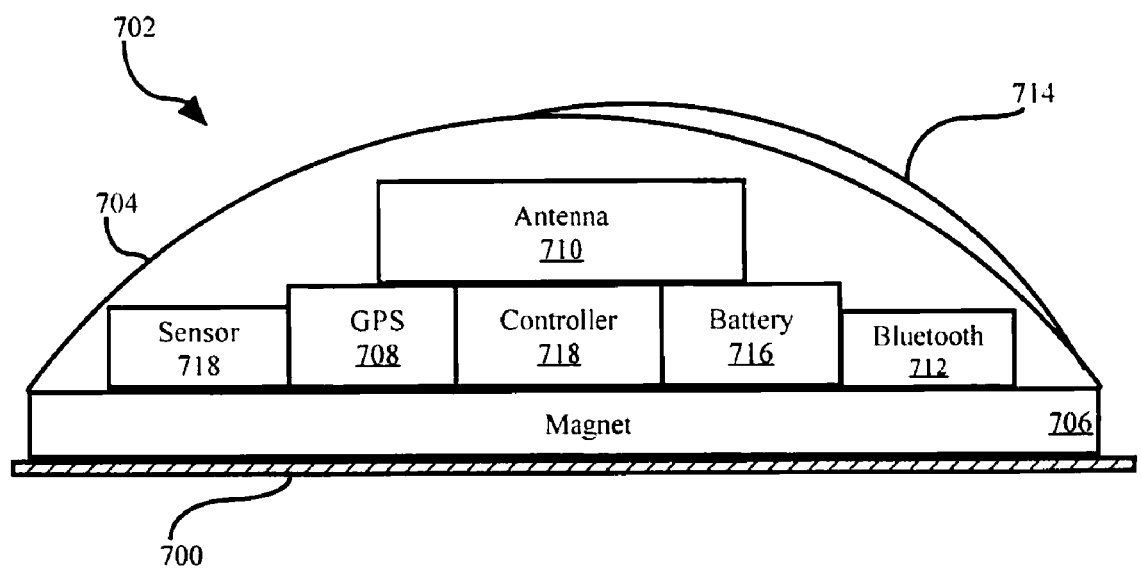
FIG. 7 is a conceptual block diagram of a GPS data acquisition unit in accordance with an embodiment of the present invention.

FIG. 7 is a conceptual block diagram of a GPS data acquisition unit 702 in accordance with an embodiment of the present invention. The GPS data acquisition unit 702 generally comprises a housing 704, supporting a GPS unit 708 and antenna 710, secured to the roof 700 of a vehicle via a magnet 706. The GPS data acquisition unit 702 communicates with a PDT (not shown) wirelessly, for example via a Bluetooth module 712. Other wireless data communication channels may be utilized, such as 802.11. A controller 718 provides overall control of the GPS data acquisition unit 702, including driving the GPS unit 702, monitoring output of a sensor 718 (described herein below), battery management, and driving the Bluetooth unit 712.

The GPS data acquisition unit 702 may be powered by the vehicle using a wire to the vehicle's battery; however it may prove preferable to configure the unit to be self powered. As such, in the embodiment illustrated in FIG. 7, a battery 716 is provided. The battery 716 may be selected from any of a variety of battery technologies including fuel cell, NiMh, NiCd, Li Ion, or Li Polymer. The battery 716 may be charged in a variety of manners, including by plugging the unit into a charging circuit, wirelessly, or using solar panels 714.

Depending on the size and efficiency of the solar panels 714, it may prove possible to power the GPS unit 708 and other support circuits using only the power generated by the solar panels 714. In this case, the battery 716 may be used in a backup function, e.g. for providing power on cloudy day or while the vehicle is in a shady area.

It is to be recognized that the magnet 706 may be replaced with any desired method and apparatus for attaching the unit 702 to the vehicle. Some examples of such methods and apparatus include: adhesive, suction cup, welding, and rivets.

A motion sensor 718 may be provided to control operation of the GPS data acquisition unit 702 so as to conserve battery power. For example, power to the GPS unit 708, the controller 718, and the Bluetooth unit 712 may be supplied only when the vehicle is moving. When the vehicle is stationary power to the designated units is conserved. Once movement is sensed, power maybe re-supplied at which point the controller 718 would attempt to establish communication with the PDT (or other computer) in the vehicle using the Bluetooth module 712.

An alternative configuration is to maintain power while the vehicle is moving and for a certain amount of time thereafter. In this manner, power would be maintained while the driver is completing his rounds, but once parked for the night, power would be conserved. In yet another alternative configuration, power would be re-supplied periodically regardless of whether the vehicle is in motion. The time period may be adjusted based on the output of the motion sensor 718. In yet another configuration, power would be limited to a pre-defined time period during which the vehicle is in use for business purposes. Outside that time frame power would conserved regardless of whether the vehicle is in motion.

Although some embodiments of the present invention have been shown and described, it will be appreciated by those skilled in the art that changes may be made in these embodiments without departing from the principles and spirit of the invention, the scope of which is defined in the claims and their equivalents.

What is claimed is:

1. A data collection system comprising:
    a portable data terminal having a first interface for receiving power and a second interface for connecting to a communication link; and
    a base having
        a housing adapted to receive and support the portable data terminal,
        a power supply receiving power from an external power source and upon insertion of the portable data terminal into the housing supplying power to the first interface on the portable data terminal,
        a communication link adapted to interface with the portable data terminal, and
        a GPS receiver, supported by the base, connected to the communication link and supplying the portable data terminal with location data via the communication link.

2. A data collection system, as set forth in claim 1, wherein the base further comprises a switch coupled to the portable data terminal and to the GPS receiver and responsive to a signal form the portable data terminal to connect the GPS receiver to the communication link.

3. A data collection system, as set forth in claim 1, wherein the communication link conforms to a serial communication standard.

4. A data collection system, as set forth in claim 3, wherein the communication link conforms to one of the IEEE 1394 standard and the USB standard.

5. A data collection system, as set forth in claim 1, wherein the base further comprises a USB hub connecting the GPS receiver to the communication link.

6. A data collection system, as set forth in claim 1, wherein the communication link is wireless.

7. A data collection system, as set forth in claim 2, wherein the base further comprises a controller that controls the operation of the switch.

8. A data collection system, as set forth in claim 1, wherein the base further comprises a memory that stores location based information.

9. A data collection system, as set forth in claim 8, wherein the location based information comprises maps.

10. A data collection system, as set forth in claim 8, wherein the location based information is accessed based on the output of the GPS receiver.

11. A data collection system comprising:
    a portable data terminal having a first interface for receiving power and a second interface for connecting to a communication link; and
    a base having
        a housing adapted to receive and support the portable data terminal,
        a power supply receiving power from an external power source and upon insertion of the portable data terminal into the housing supplying power to the first interface on the portable data terminal,
        a communication link adapted to interface with the portable data terminal, and
        means for determining a location of the base, supported by the base, connected to the communication link and supplying the portable data terminal with location data via the communication link.

12. A data collection system, as set forth in claim 11, wherein the means for determining location comprises one of a GPS receiver and a Galileo receiver.

13. A GPS unit that communicates with a portable data terminal, the GPS unit comprising:
    a housing adapted to be secured to an exterior surface of a vehicle;
    a battery supported by the housing;
    a solar panel supported by the housing and supplying power to the battery;
    a communication link adapted to interface with the portable data terminal; and
    a GPS receiver supported by the housing and connected to the communication link and supplying the portable data terminal with location data via the communication link.

14. A GPS unit, as set forth in claim 13 wherein the housing is adapted to be removably secured to the surface.

15. A GPS unit, as set forth in claim 14, further comprising a magnet removably securing the housing to the metal surface.

16. A GPS unit, as set forth in claim 13 further comprising a sensor that determines when the housing is moving and a power controller that supplies power to the GPS receiver based on the output of the sensor.

17. A GPS unit, as set forth in claim 16, wherein the power controller limits power to the GPS receiver when tie sensor determines that the vehicle has not moved for a predetermined period of time.

18. A GPS unit, as set forth in claim 17, wherein the communication link conforms to one of an 802.11 standard and a BLUETOOTH standard.

19. A GPS receiver, as set forth in claim 13, further comprises a power controller that limits power to the GPS receiver based on time.

20. A GPS unit, as set forth in claim 13 wherein the communication link is a wireless Presently amended link.

* * * * *